UNITED STATES PATENT OFFICE.

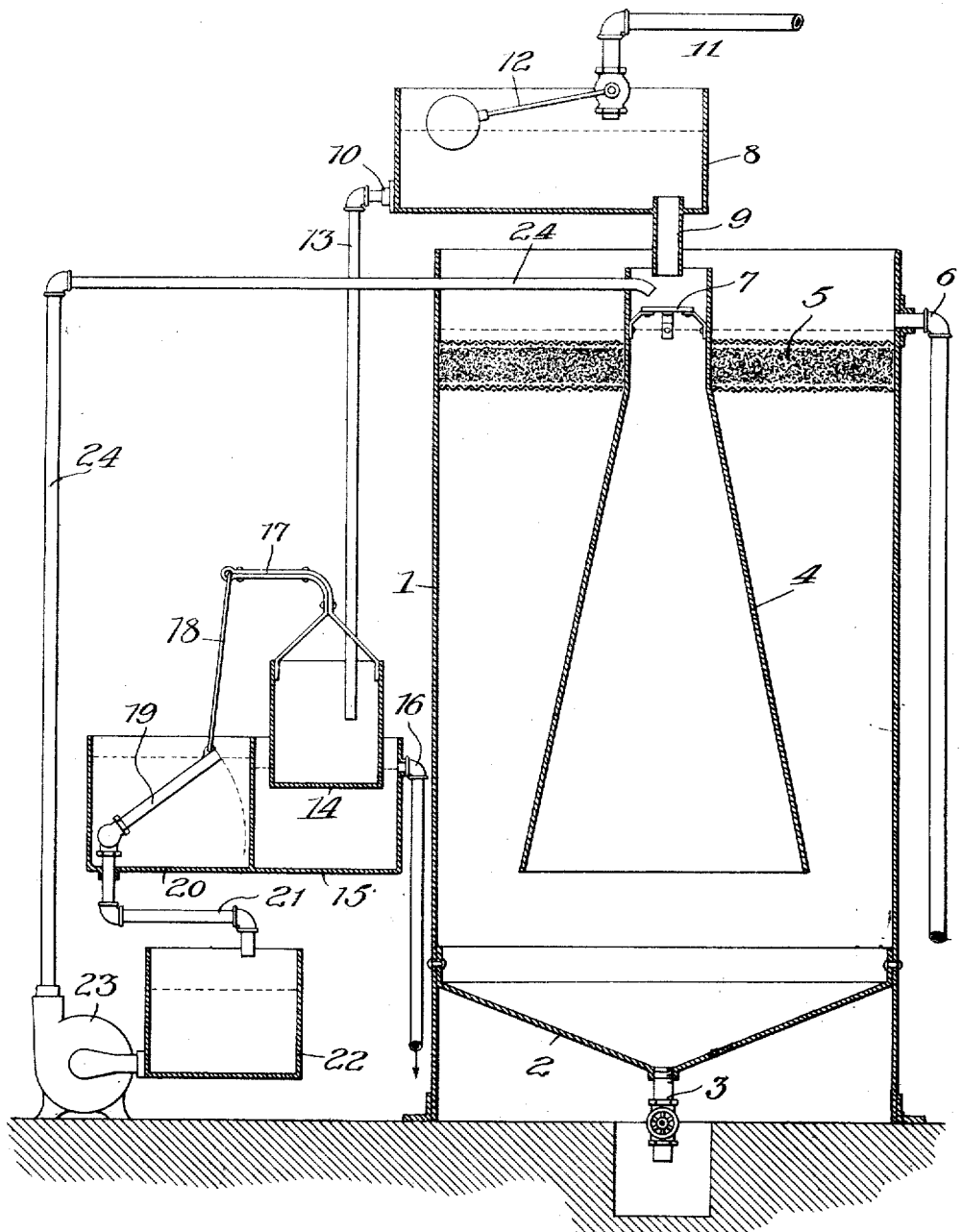

CASS L. KENNICOTT, OF CHICAGO HEIGHTS, ILLINOIS, ASSIGNOR OF ONE-HALF TO THE PERMUTIT COMPANY, OF NEW YORK, N. Y., A CORPORATION OF DELAWARE.

MEANS FOR REGULATING WATER-SOFTENING APPARATUS.

1,272,053.     Specification of Letters Patent.     Patented July 9, 1918.

Application filed March 20, 1916. Serial No. 85,385.

*To all whom it may concern:*

Be it known that I, CASS L. KENNICOTT, a citizen of the United States, residing at Chicago Heights, in the county of Cook and State of Illinois, have invented a new and useful Improvement in Means for Regulating Water-Softening Apparatus, of which the following is a specification.

My invention relates to certain new and useful improvements in water-softening apparatus, and is particularly concerned with means for regulating the feed of chemicals in proportion to the supply of raw water. The invention will be more fully understood from the following detailed description of one form of apparatus embodying the same, in which description reference will be had to the accompanying drawing which illustrates diagrammatically a vertical section through the essential portion of such an apparatus.

In the drawing, the numeral 1 designates a vertical cylindrical sedimentation tank, provided with the usual conical bottom 2 in the center of which there is mounted the sludge draw-off or drain 3. Extending downwardly from the upper end of the sedimentation tank is a member 4, known as a downtake, and in the annular space between the upper end of the downtake and the wall of the sedimentation tank there is mounted a filter bed 5. An outlet pipe 6 is tapped into the wall of the sedimentation tank above the filter 5 and is adapted to draw off the softened and filtered water as it rises through the filter bed. In the upper end of the downtake there is supported a flat mixing plate 7. Mounted above the sedimentation tank by suitable supports not shown, there is a fractionating box 8, having a main outlet 9 adapted to discharge directly upon the mixing plate 7, and having also a fractionating outlet 10, having a predetermined cross-sectional area so proportioned with reference to the area of the main discharge pipe 9 as to cause the water in the fractionating box to be divided into two issuing streams of the proper predetermined proportions. A raw water supply pipe 11 is arranged to discharge into the fractionating tank 8 being controlled by a float valve 12 of the usual form.

From the fractionating outlet 10, a discharge pipe 13 leads downwardly to a regulating bucket 14 which is suitably guided to float at varying levels from the surface of the water in a tank 15. In order that the level of the liquid in the tank 15 may be kept constant, for any displacement of the bucket, a normally open drain or outlet 16 is tapped into the wall of the tank at the desired level. The bucket 14 is provided with a bail in the form of a laterally bent arm 17, the end of which carries a cable 18 which is adapted to support the free end of a swiveled discharge pipe 19 arranged within a chemical tank 20. The chemical discharge line 21 which is fed from the swiveled lift pipe 19 empties into a chemical sump 22, from which the chemicals are drawn by centrifugal pump 23 and discharged through a pipe 24 upon the upper surface of the mixing plate 7, there mingling with the discharging stream of raw water from the pipe 9.

The operation of my apparatus is as follows:

Assuming that softened water is being withdrawn through the pipe 6, and raw water supplied through the pipe 11, the entering stream of raw water will by the action of the fractionating box 8, be divided, the main portion passing out through the outlet 9 onto the mixing plate 7, and a predetermined fraction discharging through the pipe 13, into the bucket 14. As this bucket fills up it will drop in the tank 15, thereby lowering the open end of the swiveled lift pipe 19, and permitting the chemicals within the tank 20 to discharge to the sump 22, from which they are drawn by the pump 23, to be forced through the pipe 24, and then on to the mixing plate 7, to be there mingled with the entering stream of raw water. The capacity of the pump 23 is equal to the maximum rate of discharge of chemicals through the pipe 21 into the sump 22, so that with any rate of chemical feed the pump will continuously elevate and discharge upon the mixing plate 7 the entire quantity of chemicals fed. By this combination of mechanisms therefore the feed of chemicals will be proportioned to the supply of raw water, the chemical flow automatically ceasing whenever the supply of raw water through the pipe 11 is cut off, and automatically starting whenever this pipe again discharges into the fractionating box 8. In like manner all variations of flow of the raw water through the pipe 11, will be accompanied by corresponding variations in the discharge of chemical, the lift pipe 19 by which the chemicals are regulated, responding in its movement to the movement of the bucket 14, which in turn is actuated by a fraction of the stream entering through the pipe 11.

Any desired means, either manual or automatic may be employed for regulating the amount of raw water entering through the pipe 11 in proportion to the quantity of softened water withdrawn from the outlet 6.

While I have shown and described in considerable detail, one specific embodiment of my invention, it is to be understood that this showing and description is illustrative only, and for the purpose of making my invention more clear, and that I do not regard the invention as limited to these details nor to any of them, except in so far as I have included such limitation within the terms of the following claims, in which it is my intention to claim all novelty inherent in my invention as broadly as is permissible in view of the prior art.

What I claim as new, and desire to secure by Letters Patent is:

1. In a water-softening apparatus, means for supplying raw water, means for dividing the water supplied into a main stream and a regulating stream, a bucket tank, a bucket floating therein, means for discharging the regulating stream into the said bucket, a chemical tank, a vertically movable outlet member for said tank, connections between said bucket and said outlet member for actuating the latter from the former, and means for discharging the chemicals passing through the said outlet member into said main stream of raw water.

2. In a water-softening apparatus, a sedimentation tank, a fractionating box mounted above the said tank for discharge by gravity thereinto, means for supplying raw water to said fractionating box, said fractionating box being arranged to divide the water entering the same into a main stream which discharges into the sedimentation tank and a regulating stream which discharges separately, a bucket tank, a bucket floating therein, means for discharging the regulating stream into said bucket, a chemical tank, a lift-pipe swiveled to swing in a vertical plane within the said chemical tank, direct connections between said lift-pipe and said bucket whereby these parts rise and fall in unison, and means for discharging the chemical passing out through the said lift-pipe into the said sedimentation tank.

CASS L. KENNICOTT.

In the presence of—
O. C. AVISUS,
N. M. COLLINS.